United States Patent [19]

Allan

[11] 4,028,238

[45] June 7, 1977

[54] TREATMENT OF MUNICIPAL WASTE SLUDGES

[75] Inventor: John L. Allan, Glen Rock, N.J.

[73] Assignee: Dart Industries Inc., Los Angeles, Calif.

[22] Filed: Nov. 3, 1975

[21] Appl. No.: 628,454

[52] U.S. Cl. .................................. 210/53; 210/10; 210/67

[51] Int. Cl.$^2$ ........................................... C02C 3/00

[58] Field of Search ........................ 210/10, 65–68, 210/52–54, 59, 60, 61, 42 R

[56] References Cited

UNITED STATES PATENTS

| | | | |
|---|---|---|---|
| 3,171,801 | 3/1965 | Rice et al. ............................ | 210/53 |
| 3,300,407 | 1/1967 | Priesing et al. ...................... | 210/10 |
| 3,440,166 | 4/1969 | Davis et al. .......................... | 210/10 |
| 3,472,767 | 10/1969 | Lees ...................................... | 210/10 |
| 3,623,975 | 11/1971 | Cardinal, Jr. ......................... | 210/67 |
| 3,642,619 | 2/1972 | Lo Sasso et al. ..................... | 210/10 |
| 3,997,438 | 12/1976 | Weiland et al. ................. | 210/42 R |

FOREIGN PATENTS OR APPLICATIONS

| | | | |
|---|---|---|---|
| 816,399 | 7/1959 | United Kingdom ................. | 210/52 |

*Primary Examiner*—Frank A. Spear, Jr.
*Assistant Examiner*—Benoit Castel
*Attorney, Agent, or Firm*—Margareta LeMaire; F. S. Valles; B. W. Brennan

[57] ABSTRACT

A highly concentrated municipal waste sludge is recovered in a process which involves adding alum and a flocculating agent under alkaline conditions to a dilute waste sludge, adding calcium oxide or hydroxide and filtering the resultant mixture under pressure.

6 Claims, No Drawings

TREATMENT OF MUNICIPAL WASTE SLUDGES

BACKGROUND OF THE INVENTION

In the treatment of raw municipal wastes for sanitary disposal, there results at least one stream of waste sludge containing suspended solids in concentrations usually in the range of 1 to 5 percent by weight. To prevent contamination of available water supply local ordinances usually prohibit the disposal of such sludges without further treatment. In larger communities having complete facilities for municipal waste disposal, the aforementioned waste sludges are often digested in a digester for anaerobic decomposition of the suspended organic material into an odorless and non-putrescible residue, which can be disposed of without any problem. The mixture of carbon dioxide and methane resulting from the digestion is easily burned and can be used for heat and power production. Where no such complete facilities are available and the direct disposal of waste sludges into the immediate environment is not permitted, the sludges must be treated either to remove the solids from the water phase or to concentrate the sludges sufficiently to permit transport of the solids or the concentrated sludges to a remote treatment facility or landfill area, where safe disposal can be made without causing health hazards.

A serious problem in these circumstances is the extreme difficulty encountered in concentration of the waste sludges, which do not settle or filter readily. Some improvement in settling rate is had by adjusting the pH to a value in the alkaline range, e.g. at a pH of 11. Chemical precipitation has also been suggested for the purification of sewage. This involves the use of a compound such as alum which forms a gelatinous precipitate under alkaline conditions and which acts as an adsorbent for the impurities. A coagulant or flocculating agent is usually added to increase the particles size of the impurities. However, waste sludges thus conditioned can only be dewatered by filtration with extreme difficulty, and the solids content of the sludge after dewatering is considerably less than 15 percent by weight. The disposal thereof is still a problem in that the high water content precludes the disposal by incineration and that transport of the sludge to a safe disposal is not economically feasible.

It is therefore an object of the present invention to provide a process for the concentration of municipal waste sludges for the recovery of suspended solids at higher concentrations than heretofore possible.

Another object of the invention is to provide an economically feasible process for the disposal of municipal waste sludges.

It is also another object to provide a process for dewatering municipal waste sludges to a solids content sufficiently high to enable incineration of the dewatered sludge.

It is further object to provide an economical waste treatment process of municipal sludges wherein chemical consumption is kept to a minimum.

Further objects will become apparent from the following description and appended claims.

THE INVENTION

In accordance with the present invention a process for dewatering a municipal waste sludge is provided which comprises mixing alum and a flocculating agent under alkaline conditions with the waste sludge, adding thereto from about 25-75% by weight of calcium oxide or hydroxide based on the suspended solids content of the sludge, and filtering the resultant mixture under pressure.

The municipal waste sludge of this invention is typically one that has been treated in a bio-lagoon and subsequently allowed to settle in a settling tank. However, it is within the scope of this invention to treat various other dilute waste sludges containing suspended material of high organic content, and which would provide health hazards to the environment if disposed of without treatment. Usually the sludges contain about 1 to about 5 percent by weight of suspended solids, and they are commonly substantially neutral, e.g. pH in the range of 6–8. The sludge is then made alkaline by the addition of a suitable alkali, e.g. lime or any other readily available and inexpensive alkali.

The alum (aluminum ammonium sulfate) is added to the alkalized sludge in conventional amounts typically from 5–5000 mg/liter of sludge, and a gelatinous precipitate of aluminum hydroxide is formed. The alum may be added as a solids but preferably as an aqueous solution. If needed, the pH of the sludge at this point is adjusted to a value of at least 9, preferably between 10 and 11.

In order to agglomerate the suspended particles in the sludge, a flocculating agent is also added to the mixture in conventional amounts, generally 1 to 100 mg/liter of original sludge volume. A variety of flocculating agents are commercially available for this purpose and their chemical compositions are not critical to the present invention.

At this point the treated sludge will settle, and if desired, the supernatant clear liquid phase can be withdrawn and after neutralization to a pH in the range of about 6 to about 9 discharged without any pollution problems.

To the treated sludge, whether concentrated or not by the optional decantation step described above, is then added from about 25 to 75 percent by weight calcium oxide or hydroxide based on the weight of the suspended solids in the sludge under suitable agitation, and the resultant mixture is subjected to filtration, preferably under pressure. It should be understood, that for the purpose of this invention, the particular manner in which the "pressure" is applied is not important as long as a pressure differential is obtained across the filter cake. Thus super atmospheric pressure can be applied upstream of the filter or a vacuum downstream of the filter. Preferably, a pressure of at least about 0.5 atmospheres is employed and for best results a pressure of about 10 to about 15 atmospheres or even higher is used. There are many commercially available filters, which operate at the afore-mentioned high pressures and are capable of processing large sludge volumes, e.g. the Dart Hoesch filter available from Dart Industries, Inc.

Temperature does not have any significant effect on the efficiency of the process, and the filtration can be carried out at any practical and convenient temperature.

The clear filtrate obtained is subsequently neutralized to a pH in the range of 6 to 9 with any suitable acid, e.g. sulfuric acid, and the neutralized liquid can thereafter be disposed of in the conventional manner.

By the addition of calcium oxide or hydroxide to a waste sludge in accordance with this invention a several fold increase in filtration rate can be achieved as compared to prior art methods, and sustained operations can be carried out on a commercial scale without interruptions caused by clogged filters. Also, by use of the calcium oxide or hydroxide additive, the amount of other necessary additives, i.e. alum and flocculating agent can be substantially reduced, and still achieving very high filtration rates. The most important advantage, however, of the process of this invention is that the solids content of the filter cake is considerably higher than what can be obtained by any prior art method. For instance, solids contents of 60-70% by weight can easily be attained employing a relatively moderate filtration pressure of 10-12 atmospheres, while under the same conditions but in the absence of calcium oxide the solids contents do not exceed 25-35% by weight. In addition, the filter cake resulting from operations in accordance with this invention is considerably stiffer and more easily handled, e.g. in the removal from the filter.

Due to the high solids content and the ease of handling of the filter cake, disposal thereof causes no particular problems, in that transporting of the solids to a remote disposal area e.g. for land fill purposes is now a feasible solution from an economical standpoint.

A particularly advantageous manner of disposing of the filter cake is to incinerate it, which now can easily be done due to the low water content of the recovered filter cake. In the incineration the organic material is burned off producing considerable heat that can be recovered as useful energy, e.g. steam. The incinerator residue, which mostly consists of calcium oxide is advantageously at least in part recycled to the process, thereby minimizing if not wholly obviating the need for fresh calcium oxide or hydroxide within the process.

In order to provide a better understanding of the invention reference is had to the following examples. In all experiments an activated sludge containing about 18.3 gms/liter of suspended solids and having a pH of 6.3 was first adjusted with lime to a pH in the range of 11.5-12.0. After alum addition (all examples except reference Example A), the pH was again adjusted, where necessary, to a value in the range of 10.3 - 10.6. In those examples where flocculating agent was added, the addition thereof was made after the final pH adjustment.

All filtrations were carried out at 55° C sludge temperature and under a vacuum of 0.5 atmospheres and employing a 9.0 cm. diam. Buchner funnel and a polypropylene filter cloth. For scale up trials, a P-2.5 Model DART Hoesch horizontal, fully automatic filter press was used. This unit filters, presses, washes, and represses filter cakes at pressures up to 15 atmospheres, and discharges the thus separated solids in a completely automated operation. Its performance duplicates closely that of the commercially-sized units with total filter plate areas of up to at least 32 square meters.

REFERENCE EXAMPLES 1-4

This set of experiments demonstrates the poor results had in attempting to filter a sludge, which has been subjected to various prior art treatments known to improve settling and filtration rates thereof.

The sludge of Example 1 received no other treatment but initial pH adjustment. Attempts to filter the sludge were completely unsuccessful due to clogging of filter.

In Example 2, the sludge was also treated with 0.1% (w/v) alum and was now filterable, however, the rate of 2.4 gal/sq.-ft./hr. was extremely slow and the solids content of the filter cake was only about 12.2% by weight.

Example 3 was carried out as Example 2, except that 0.001% (w/v) of an anionic flocculating agent (available from American Cyanamid under the tradename of MAGNIFLOC 835-A) was also added to the sludge prior to filtration. The filtration rate was slightly improved to 5.8 gal./sq.-ft./hr. by the addition of flocculating agent, but the solids content of the filter cake was still only about 13.5% by weight. Repeating the experiment using a high pressure filter operating at 12 atmospheres resulted in a filter cake of about 30-35% solids content.

Example 4 was carried out as Example 3 except that the amounts of alum and flocculating agent were doubled, and this had the effect of a further, but relatively small, increase in filtration rate to 13.5 gals./sq.-ft./hr. but no substantial increase in solids content, which was 15.0% by weight, after pressing at 1 atmosphere.

EXAMPLES 5-6

These examples demonstrate the superior filtration rates had when subjecting the sludges to treatment with calcium oxide in accordance with the present invention.

In both Examples 5 and 6, the activated sludges were treated essentially in the same manner as in Reference Example 3, i.e. the pH adjustments, alum additions (0.1% w/v), and flocculant additions (0.001% w/v), were the same. The sludges were then allowed to settle for one hour and the supernatant phase was decanted off, which amounted approximately 50% of the original volume.

In Example 5, 0.5% w/v calcium oxide based on the original sludge volume was stirred into the concentrated sludge and filtration was carried out. The observed filtration rate was 41 gals./sq.-ft./hr. which represents a 7-fold increase over that obtained in the absence of calcium oxide addition. The solids content was about 24.6% by weight after pressing at 1 atmosphere, and when the experiment was repeated and filtration carried out at 12 atmospheres a solids content in the range of about 70% could be obtained. It should be noted that if no decantation had been carried out, the filtration rate would have been considerably higher than the observed rate of 41 gals./sq.-ft./hr., and the improvement had with the invention would have been even more evident, e.g. when compared with results of Example 3.

Example 6 was carried out as Example 5 except that the amount of calcium oxide used was doubled. A filtration rate of 34.3 gals./sq.-ft./hr. was observed and the resultant filter cake had a solids content of 28.1% by weight after pressing at 1 atmosphere. The data indicate that no particular advantage is had with the increased addition of calcium oxide.

The filtrates from Examples 5 and 6 were extremely clear and had a turbidity in the range of 9-15 FTU (Formazin turbidity units), when measured in a HACH turbidimeter Model 2100A using standard techniques.

A summary of pertinent data from Examples 1-6 is presented in TABLE I.

TABLE I

| Experiment | Dewatering of Waste Sludges | | | | | |
|---|---|---|---|---|---|---|
| | 1 | 2 | 3 | 4 | 5 | 6 |
| Sludge - volumes | 100 | 100 | 100 | 100 | 100 | 100 |
| Alum - % w/v | — | 0.1 | 0.1 | 0.2 | 0.1 | 0.1 |
| Flocculant - % w/v | — | — | 0.001 | 0.002 | 0.001 | 0.001 |
| Calcium oxide - % w/v | — | — | — | — | 0.5 | 1.0 |
| Filtration Rate - gal./sq.-ft./hr. | 0 | 2.4 | 5.8 | 13.5 | 41 | 34.3 |
| % Solids - (at 0.5 atms) | — | 12.2 | 13.5 | 15$^{(1)}$ | 24.6$^{(1)}$ | 28.1$^{(1)}$ |
| % Solids - (at 12 atms) | — | — | 30–35 | | 70 | — |

$^{(1)}$At 1 atmosphere

Essentially the same results as above are obtained using calcium hydroxide instead of the oxide, and various grades containing, for example, as much as 15% magnesium oxide or hydroxide. While particular embodiments of this invention are illustrated above, it will be understood that the invention is obviously subject to variations and modifications without departing from its broader aspects.

What is claimed is:

1. In a process for dewatering a municipal waste sludge, having a suspended solids content between about 1 and about 5 percent by weight, wherein said sludge is subjected to treatment with sufficient quantities of calcium oxide or hydroxide and from about 5 to about 5000 milligrams alum per liter of waste sludge to obtain a pH value in the range from about 10 to about 11, and a flocculating agent is added thereto in amounts of from about 1 to about 100 milligrams per liter of said waste sludge, whereby a flocculated sludge containing precipitated aluminum hydroxide is obtained, the improvement which comprises:
   a. adding to the flocculated sludge from about 25 to 75% by weight of calcium oxide or hydroxide based on the weight of suspended solids in the municipal waste sludge before said treatment, and
   b. filtering the resultant mixture under a pressure of at least about 0.5 atmospheres to obtain a liquid filtrate and a solids filter cake.

2. A process according to claim 1, wherein the pressure is in the range of about 10 to about 15 atmospheres.

3. A process according to claim 1, wherein the filtrate is adjusted to a pH in the range of about 6 to about 9 and released to the environment.

4. A process according to claim 1, wherein the filter cake is incinerated to recover calcium oxide.

5. A process according to claim 4 wherein at least a portion of the recovered calcium oxide is recycled to step (a).

6. A process according to claim 1, wherein the flocculated sludge is allowed to settle and at least a portion of the resultant supernatant liquid phase is removed from the process prior to the addition of calcium oxide or hydroxide.

* * * * *